United States Patent
Carrie et al.

(10) Patent No.: US 8,612,650 B1
(45) Date of Patent: Dec. 17, 2013

(54) VIRTUAL EXTENSION OF BUFFER TO REDUCE BUFFER OVERFLOW DURING TRACING

(75) Inventors: Martial Carrie, Rancho Santa Margarita, CA (US); James C. Wilshire, Capistrano Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 105 days.

(21) Appl. No.: 13/419,214

(22) Filed: Mar. 13, 2012

(51) Int. Cl.
*G06F 3/00* (2006.01)

(52) U.S. Cl.
USPC .................................. 710/52; 710/58; 710/74

(58) Field of Classification Search
None
See application file for complete search history.

(56) References Cited

U.S. PATENT DOCUMENTS

| | | | |
|---|---|---|---|
| 5,802,584 A * | 9/1998 | Kool et al. | 711/154 |
| 5,829,026 A * | 10/1998 | Leung et al. | 711/122 |
| 5,884,100 A * | 3/1999 | Normoyle et al. | 710/52 |
| 6,157,984 A * | 12/2000 | Fisher et al. | 711/112 |
| 6,266,789 B1 * | 7/2001 | Bucher et al. | 714/39 |
| 6,553,435 B1 * | 4/2003 | Normoyle et al. | 710/22 |
| 7,315,957 B1 * | 1/2008 | Wagner et al. | 713/501 |
| 7,565,576 B2 * | 7/2009 | Seroff | 714/27 |
| 7,707,394 B2 | 4/2010 | Ashfield et al. | |
| 8,024,614 B2 * | 9/2011 | Nadehara | 714/34 |
| 8,407,497 B2 * | 3/2013 | Magklis et al. | 713/320 |
| 2002/0178405 A1 | 11/2002 | McCullough et al. | |
| 2003/0229823 A1 | 12/2003 | Swaine et al. | |
| 2004/0158776 A1 | 8/2004 | McCullough et al. | |
| 2006/0112310 A1 | 5/2006 | McHale et al. | |
| 2006/0117229 A1 | 6/2006 | Swaine et al. | |
| 2006/0242470 A1 | 10/2006 | McCullough et al. | |
| 2007/0011492 A1 | 1/2007 | Swaine | |
| 2007/0050600 A1 | 3/2007 | Hill et al. | |
| 2008/0155353 A1 | 6/2008 | Craske | |
| 2008/0235538 A1 | 9/2008 | Horley et al. | |
| 2008/0273595 A1 * | 11/2008 | Huang et al. | 375/240.12 |
| 2009/0089626 A1 | 4/2009 | Gotch et al. | |
| 2009/0183034 A1 | 7/2009 | Houlihane et al. | |
| 2009/0313507 A1 | 12/2009 | Swaine et al. | |
| 2010/0257510 A1 | 10/2010 | Horley et al. | |
| 2011/0296110 A1 * | 12/2011 | Lilly et al. | 711/118 |

OTHER PUBLICATIONS

CoreSight Trace Memory Controller Technical Reference Manual, Revision r0p0, ARM Limited, Jun. 22, 2010.
Embedded Trace Macrocell ETMv1.0 to ETMv3.5 Architecture Specification, ARM Limited, Sep. 23, 2011.

* cited by examiner

*Primary Examiner* — Cheng-Yuan Tseng

(57) ABSTRACT

A system is disclosed comprising a processor, a trace module, a second buffer, and a bridge. The trace module has a first buffer configured to receive trace data from the processor at a first clock frequency. The second buffer is configured to receive trace data from the first buffer at a second clock frequency. The bridge is configured to receive trace data from the second buffer and output the trace data received from the second buffer at a third clock frequency. The second clock frequency is greater than the first clock frequency and the third clock frequency.

20 Claims, 3 Drawing Sheets

VIRTUAL EXTENSION OF BUFFER TO REDUCE BUFFER OVERFLOW DURING TRACING

BACKGROUND

A system having one or more processors may include debug resources to facilitate debugging of the system. For example, a system on a chip (SOC) may include debug resources integrated on the chip to facilitate debugging. The debug resources may include a trace source that provides a trace output of code execution and/or data in a processor for monitoring the operation of the processor. An operator may connect an external debugger to the system to control the trace source and view the trace output of the trace source. The external debugger can program the trace source through a debug access port (DAP) in the system and receive the trace output of the trace source through a trace port. For example, the external debugger can program the trace source to trace a particular program routine executed by the processor to debug the program routine.

Buffers are typically used to store data produced by a trace source. However, the bandwidth of data produced by a trace source may vary greatly during tracing operations. A large peak of trace data may overflow a buffer, causing loss of trace data. Proposed solutions have included stalling the processor being traced, or halting data trace operations.

BRIEF DESCRIPTION OF THE DRAWINGS

The accompanying drawings, which are included to provide further understanding of the embodiments of the invention and are incorporated in and constitute a part of this specification, illustrate embodiments of the invention and together with the description serve to explain the principles of the various embodiments. In the drawings.

DETAILED DESCRIPTION

In the following detailed description, numerous specific details are set forth to provide a full understanding of the present disclosure. It will be apparent, however, to one ordinarily skilled in the art that the present disclosure may be practiced without some of these specific details. In other instances, well-known structures and techniques have not been shown in detail to avoid unnecessarily obscuring the present disclosure.

Figures 1, 2:
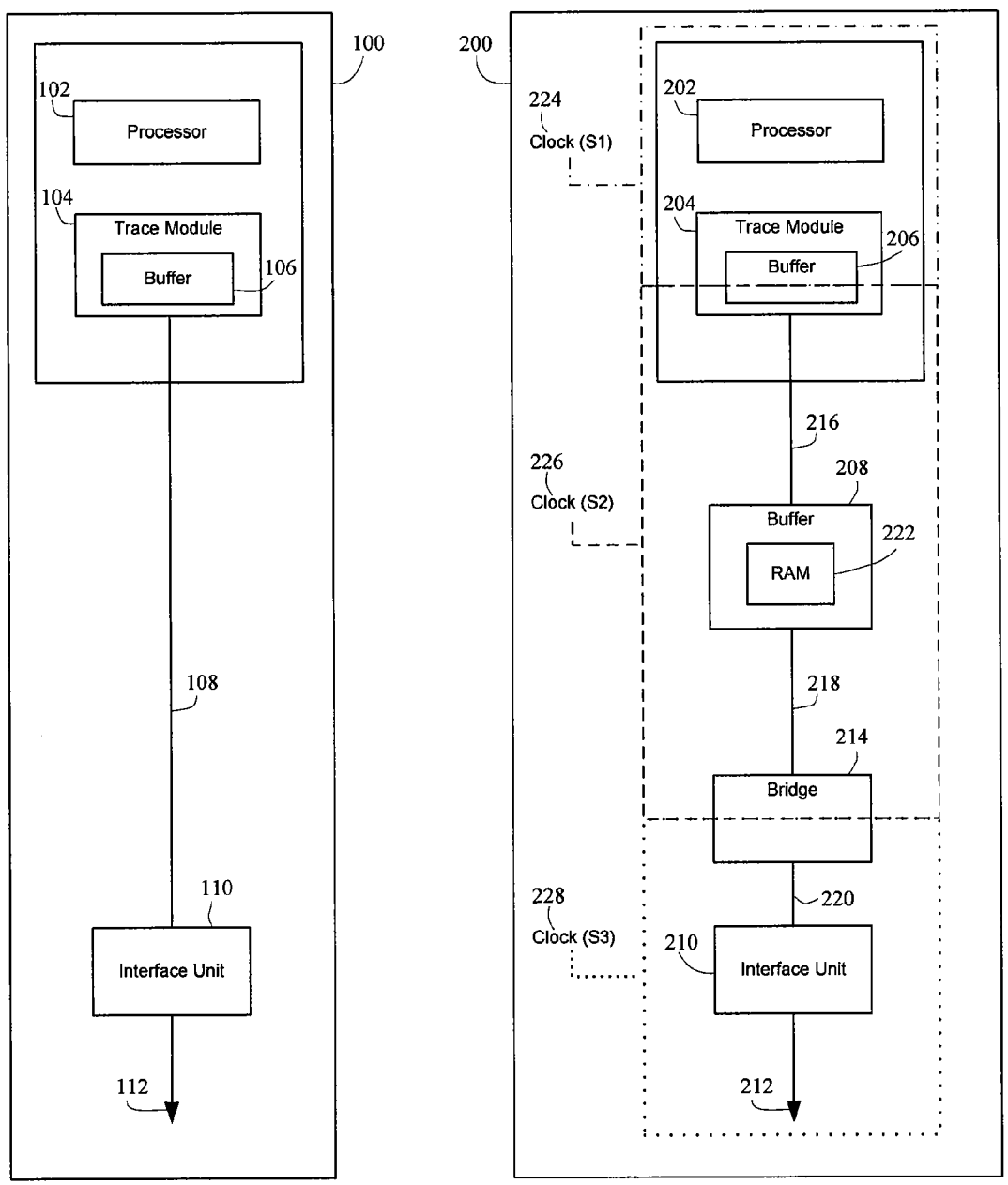
FIG. 1 is a block diagram of a prior art system.
FIG. 2 is a block diagram of a system for reducing buffer overflow during data tracing, according to an embodiment of the present invention.

FIG. 1 illustrates a prior art system 100 for providing trace output from a processor 102. The prior art system 100 includes the processor 102, a trace module 104, a buffer 106, a bus 108, and an interface unit 110 that outputs to an output 112. In the prior art system 100, the trace module 104 is configured to extract trace data from the processor 102. Such trace data may be used for debugging purposes, to detect errors in the operation of the processor 102. The trace data extracted by the trace module 104 may be stored temporarily within the buffer 106 of the trace module 104. The buffer 106 typically has a set storage capacity. After the trace data has been stored in the buffer 106, it is then transferred via the bus 108 to the interface unit 110, which prepares the data for output to the output 112. Such an output 112 may comprise a connector, for example a debugging connector, which allows another processor to analyze the trace data received from processor 102.

The prior art system 100 is limited, however, by the storage capacity of the buffer 106. The size of the buffer 106 serves as a choke point for the trace data received from the processor 102. During times when relatively small amounts of trace data are received from the processor 102, then the size of the buffer 106 will likely not serve as a limiting factor. However, if large amounts of trace data, or a data peak, are output from the processor 102, then the buffer 106 may not be large enough to store information associated with data peak. In this situation, the buffer 106 may overflow, resulting in loss of trace data. A method to prevent this overflow may be to stall the processor 102. However, this method necessarily reduces the operational efficiency of the processor 102. Another method to address this overflow is simply to accept that not all trace data will be recovered. However, this method will reduce the effectiveness of the trace operation itself. Reducing the possibility of overflow enhances accurate tracing and efficient debugging, for example, firmware debugging.

Debug System with Virtual Buffer Extension

FIG. 2 illustrates an embodiment of a system 200 designed at least in part to address the problems of the prior art system 100. In one embodiment, the system 200 is designed to reduce overflow of a buffer during tracing operations. The system 200 includes a processor 202, a trace module 204, a first buffer 206 of the trace module 204, and an additional, or second buffer 208. In one embodiment, the system 200 also includes an interface unit 210 configured to output data to an output 212. A bridge 214 links the second buffer 208 to the interface unit 210. A bus 216 may link the trace module 204 to the second buffer 208, a bus 218 may link the second buffer 208 to the bridge 214, and a bus 220 may link the bridge 214 to the interface unit 210.

The processor 202 may be a general purpose processor capable of executing instructions for a variety of purposes, or may be a specialized processor for executing specialized instructions for only dedicated purposes. For example, in one embodiment, the processor 202 may be configured to control aspects of a hard drive system, for example, the operation of the disk or the operation of a read/write head. In one embodiment, the processor 202 may serve as a controller for controlling the operation of other processors. The processor 202 is designed to process and execute a stream of instructions, some of which may be evaluated to determine if error has occurred in the processing or prior to the processing of the instructions.

The trace module 204 may comprise a trace data collection unit, or a unit configured to extract trace data from the operation of the processor 202. The trace module 204 may be configured to allow for a real time trace of the operations of the processor 202. The trace module 204 may be configured to sample the processes performed by the processor 202. The trace module 204 may be configured to sample the processes through a variety of methods, including inserting instructions into the processes of the processor 202, which serve as a flag for later retrieval by the trace module 204. Such extraction and receiving of trace data may also include identifying events in the processor's operation and writing trace data related to the event. In addition, in one embodiment, the trace module 204 may be configured to specifically identify a particular process performed by the processor 202, and extract all data related to this process. The trace module 204 may be selectively operable, to only extract trace data from the processor 202 at a desired time, or based upon certain operations of the processor 202.

In one embodiment, the trace module 204 may be configured to extract trace data for debugging purposes. The trace module 204 may be configured to extract trace data directed to errors in instructions and data either processed by the processor 202 or produced by the processor 202 itself. The debugging trace data may be used for firmware debugging. The debugging trace data may then be used at a later time by a processor or operator to identify and correct errors in the operation of the processor 202, or of a related system that the processor 202 operates in conjunction with. In an embodiment in which the trace module 204 is used for debugging purposes, it may be important for all trace data related to debugging purposes to be recovered by the trace module 204, to allow for later analysis of the debugging data. In one embodiment, the trace module 204 may perform encoding operations, in order to reduce the trace data size prior to transfer for output.

In the embodiment shown in FIG. 2, the trace module 204 stores the retrieved trace data in the first buffer 206. The first buffer 206 may comprise a first in first out (FIFO) buffer, or a buffer that queues trace data for extraction from the trace module 204 based on the sequence in which trace data first enters the first buffer 206. In one embodiment, the first buffer 206 may be configured to queue trace data input into the first buffer 206 in varied orders and sequences that control the extraction of trace data from the first buffer 206. In one embodiment, the first buffer 206 may be configured to store the trace data encoded by the trace module 204. In the embodiment shown in FIG. 2, the first buffer 206 of the trace module 204 may be integrated into the trace module 204 as a component of the trace module 204. In one embodiment, the first buffer 206 may comprise a separate component, distinct from the trace module 204. In one embodiment, the first buffer 206 may comprise random access memory (RAM) configured for the trace data to be written to the first buffer 206 and read from the first buffer 206. In other embodiments, the first buffer 206 may be implemented as any other form of memory, either as disk drive or a similar solid state drive, or the like. In one embodiment, the first buffer 206 may have a capacity of approximately 144 bytes, although this amount may be varied as desired.

In one embodiment, a bus 216 couples the trace module 204 to a second buffer 208. The bus 216 allows the trace data stored in the first buffer 206 to be transferred to the second buffer 208. The second buffer 208, similarly as the first buffer 206, may comprise a first in first out (FIFO) buffer, or a buffer that queues trace data for extraction from second buffer 208 based on the sequence in which the trace data first enters the second buffer 208. As will be further discussed, the second buffer 208 acts thus as a virtual extension of the first buffer 206, and thus addresses some of the above described issues encountered in the prior art systems.

In one embodiment, the second buffer 208 may be configured to queue trace data input into the second buffer 208 in varied orders and sequences that control the extraction of trace data from the second buffer 208. The second buffer 208 may have a parameterized storage capacity. In one embodiment, the second buffer 208 may comprise a FIFO including memory in the form of RAM 222 configured to store the trace data input into the second buffer 208. In one embodiment, the RAM 222 may comprise dedicated static random access memory (SRAM) or other similar volatile RAM memory. In the embodiment shown in FIG. 2, the second buffer 208 is a component that is separate from the trace module 204. In another embodiment, the second buffer 208 may comprise a component of the trace module 204. Although the second buffer 208 in FIG. 2 is shown to include RAM 222, in other embodiments, the second buffer 208 may be implemented as any other form of memory, either as disk drive or a similar solid state drive, or the like.

In one embodiment, a bus 218 connects the second buffer 208 to the bridge 214. The bridge 214 comprises a data rate bridge, which may operate to vary a data rate input into the bridge 214 either synchronously or asynchronously. The bridge 214 may be configured to decrease a data rate, or data frequency received at the input of the bridge 214 for output through the bridge 214. The bridge 214 is shown in FIG. 2 as a separate component of both the second buffer 208 and the trace module 204. In one embodiment, the bridge 214 may comprise a component integral with either the trace module 204 and/or the second buffer 208.

In one embodiment, a bus 220 connects the bridge 214 to the interface unit 210. The interface unit 210 may comprise a trace port interface unit that prepares the trace data received from the bridge 214 for output. Such preparation may include decompressing or decoding the trace data if the trace module 204 previously compressed or coded the trace data. The interface unit 210 is configured to output trace data received from the bridge 214 to an output 212. The output 212 may comprise a trace interface, or a connector which allows a processor or user to analyze the trace data received from the processor 202. The trace interface may allow the trace data to be output and analyzed by data analysis tools that measure or identify properties or metrics. In one embodiment, in which the system 200 is used for debugging purposes, the output 212 may comprise a debugging connector allowing a processor to analyze the debugging trace data extracted by the trace module 204. In one embodiment, the output 212 may comprise a trace interface having two serial ports, each capable of outputting approximately six gigabits of data per second, although this amount may be varied as desired.

In one embodiment, the busses 216, 218, and 220 may comprise 32 bit busses, although this size may be varied as desired.

Although each of the components shown in FIG. 2 is shown to be distinct, any variety of the components may be integrated together, as desired. In the embodiment shown in FIG. 2, each component is implemented as a circuit placed, or embedded, upon a chip. In one embodiment, the components may be each placed upon different chips in a variety of combinations, as desired. In one embodiment, any component or components of the system 200 may be implemented as software, the implementation of which is produced by a processor.

In one embodiment, the use of the second buffer 208 allows the system 200 to effectively increase the amount of trace data that may be extracted from the processor 202 at a given moment. The second buffer 208 is configured to have a trace data storage capacity that allows the trace data held in the first buffer 206 to be transferred to the second buffer 208. The transferred data may be removed from the first buffer 206, therefore allowing further trace data to be placed in the first buffer 206.

Clock Rate Management

In the embodiment shown in FIG. 2, the trace module 204 may be configured to output the trace data received from the processor 202 at a greater data frequency than the frequency at which the trace data is received by the trace module 204. In one embodiment, to achieve this result, a portion of the trace module 204 and/or the second buffer 208 may be clocked to operate at a higher clock rate than that of the processor 202. In the embodiment shown in FIG. 2, the processor 202 and a portion of the first buffer 206 and trace module 204 operate at first clock speed S1 (224). S1 (224) may be set as the normal operating frequency of the processor 202, and allows trace data to be received by the first buffer 206 at the same clock frequency. In another embodiment, the clock speed of the portion of the first buffer 206 and the trace module 204 shown to be within the clock speed boundary 224 may be different than the clock speed of the processor 202.

The second buffer 208 may be clocked to operate at a higher clock speed S2 (226) than that of the processor 202 (S1). Thus, the trace data is extracted from the first buffer 206 to the second buffer 208 at a higher data frequency than the frequency at which the trace data is received by the first buffer 206. In addition, in the embodiment shown in FIG. 2, a portion of the first buffer 206 and the trace module 204 are shown to be within the clock boundary 226, which operates at S2 (226). In another embodiment, the portion of the first buffer 206 and the trace module 204 shown to be within the clock speed boundary 226 may operate at a clock speed that is different than the clock speed of the second buffer 208.

In the embodiment shown in FIG. 2, at least a portion of the bridge 214 is configured to operate at S2 (226), which is relatively higher than the operating frequency of the processor 202 (S1). This portion of the bridge 214 therefore extracts the trace data from the second buffer 208 at S2 (226), which may be higher than the frequency at which the first buffer 206 receives trace data from the processor 202. The bridge 214 may be configured to output the trace data at a clock speed S3 (228) that is slower than S2 (226), the rate the bridge 214 receives the trace data. In one embodiment, the portion of the bridge 214 may operate at a clock speed that is different than the clock speed of the second buffer 208, or the processor 202.

In the embodiment shown in FIG. 2, a portion of the bridge 214 is clocked at S3 (228), which may be different than the clock speed S2 (226), and/or the clock speed S1 (224). In one embodiment, S3 (228) is set to be S1 (224), so the bridge 214 may output the trace data received from the second buffer 208 at a clock frequency that is the same as the clock frequency at which the first buffer 206 received the trace data from the processor 202. In this embodiment, the bridge 214 serves to return the trace data to a clock frequency that matches the frequency of the processor 202. In this embodiment, the overclocking of the portion of system 200 bounded by the clock speed boundary 226 comprises a localized increase of the clock frequency, which does not otherwise affect operation of the processor 202, for example, or the retrieval of the trace data from the interface unit 210.

In one embodiment, the interface unit 210 receives the trace data from the bridge 214. The interface unit 210 may output the data received from the bridge 214 at a clock frequency S3 (228) slower than the frequency that the bridge 214 received the data from the second buffer 208.

Addressing the Overflow Issue

The embodiment of the system 200 shown in FIG. 2 may serve to prevent trace data overflow of the first buffer 206, which was a problem discussed above in regard to the prior art of FIG. 1. The second buffer 208 extracts trace data from the first buffer 206 at a higher data frequency than the trace data enters the first buffer 206. The second buffer 208 thus serves as a virtual extension of the first buffer 206, by allowing the trace data to be removed from the first buffer 206 at a rate faster than the trace data is received, to allow for a greater trace data capacity for the system 200.

In one embodiment, the trace data storage capacity of the second buffer 208 may be larger than that of the first buffer 206, therefore allowing the second buffer 208 to serve as a store of the trace data rapidly extracted from the first buffer 206. The second buffer 208 may continue to extract trace data from the first buffer 206, and may be configured such that the extracted trace data will not overflow the second buffer 208. In addition, the second buffer 208 may have a trace data capacity sized such that the second buffer 208 serves as a store of the trace data before the data transfer rate of the trace data is reduced to a lower frequency by the bridge 214.

The ratio R1 between (1) the clock frequency the trace module 204 at which receives trace data, and (2) the clock frequency at which the second buffer 208 receives data from the trace module 204, may be set such that overflow of the first buffer 206 is reduced. R1 may be configured such that based upon an estimated amount of trace data to be received from the processor 202, and based upon the storage capacity of the first buffer 206, that a sufficient amount of trace data is removed from the first buffer 206 to reduce overflow. In this embodiment, the possibility of overflow of the first buffer 206 is reduced, in light of the possibility that a large peak or spike of trace data may be received from the processor, which may still overflow the first buffer 206. Such peaks may be caused by a common stack push, storage of multiple commands, or the like. For example, in one embodiment, R1 may be set to between 1.3 and 1.7, although this amount may be varied as desired. In one embodiment, R1 may be set to 1.5. In one embodiment, the clock speed S2 of certain components shown in the bounded area 226 of the system 200 may only be capable of reaching approximately 1.2 gigahertz, although in various other embodiments this amount may be varied as desired. R1 may be varied in different embodiments, as desired.

In one embodiment, R1 may be set such that overflow of the first buffer 206 is entirely eliminated. In this embodiment, the total possible amount of trace data, or the total possible bandwidth that may be available from the tracing source, such as the processor 202, may be determined, and R1 may be set such that the first buffer 206 does not overflow.

An embodiment of the system 200 shown in FIG. 2 may also provide the benefit of effectively increasing the data trace storage capacity in a system in which the data storage capacity of the first buffer 206 may not be easily replaced and increased, or otherwise configured to be larger. For example, the trace module 204 may comprise a third-party vendor supplied product, which may not be easily, or cost effectively, altered in order to increase the storage capacity of the first buffer 206. One embodiment of the system 200 provides the benefit of allowing additional components to be added, for example, second buffer 208 and bridge 214, to effectively increase the trace data storage capacity of the entire system. Thus, the storage capacity of the first buffer 206 need not necessarily be modified, and the system 200 may operate within set size constraints of the first buffer 206. In this embodiment, at least one component of the system 200 may comprise a known component, available from vendors, such as ARM Holdings PLC. For example, the trace module 204 may comprise an Embedded Trace Macrocell, available from ARM Holdings PLC. In one embodiment, the first buffer 206 may have a capacity of approximately 144 bytes, and may comprise a FIFO buffer. In addition, the second buffer 208 may comprise a Trace Memory Controller, available from ARM Holdings PLC. The Trace Memory Controller may be operated in a configuration in which it serves as an Embedded Trace FIFO. In certain embodiments, the bridge 214 may comprise an Advanced Trace Bus Asynchronous Bridge, available from ARM Holdings PLC. In other embodiments, other third party vendor products may be used to comprise any component of the system shown in FIG. 2, for example. In this way, components need not be modified, but only added and operated as desired.

Additional benefits of some embodiments include that the pin output of the external trace may be kept to a minimum, or may not need to be modified as provided from a third party vendor. The trace pins may be kept to a minimum due to the ability to smooth out the peaks of trace activity internal to the system 200, while maintaining the same level of trace egress capability external to the system 200.

The system 200 shown in FIG. 2 may also provide the benefit of allowing the processor speed to be increased, without needing to increase the trace speed. Retaining the trace clock speed at a lower rate will save power and die area associated with trace and debug logic.

Method Flow

Figure 3:
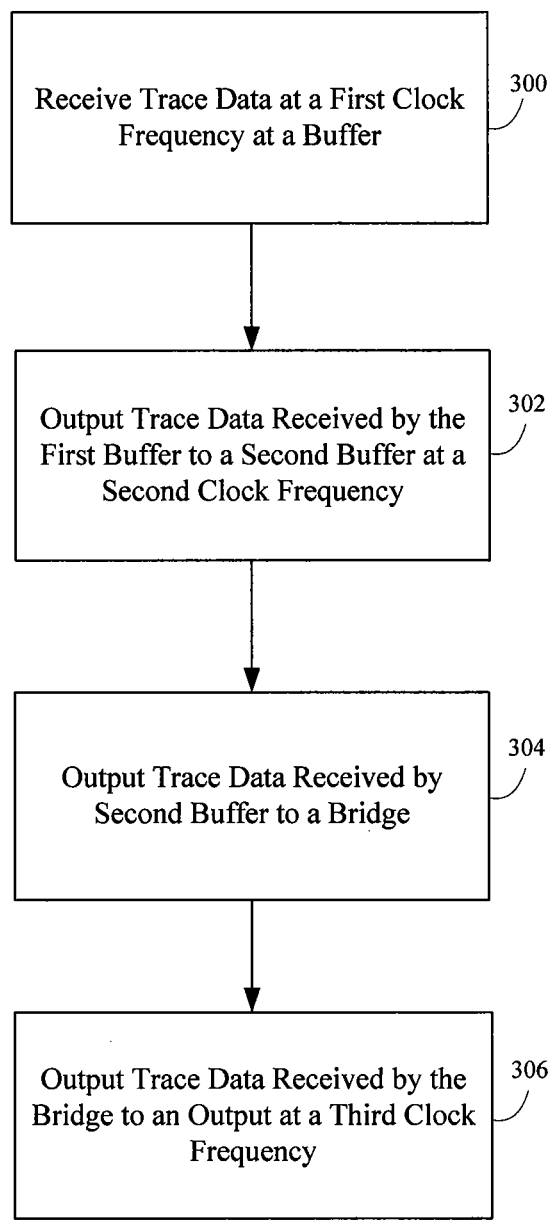
FIG. 3 is a flow diagram of a method for reducing buffer overflow during data tracing, according to an embodiment of the present invention.

FIG. 3 illustrates a method of reducing buffer overflow during tracing operations, which may be implemented by the embodiment of the system 200 shown in FIG. 2. In block 300, trace data is received at a first clock frequency at a first buffer. In one embodiment, the trace data may comprise the data received by the first buffer 206 from the processor 202. In block 302, trace data received by the first buffer is output to a second buffer at a second clock frequency. In one embodiment, the first buffer 206 may output trace data to the second buffer 208. The second clock frequency may be the frequency at which the data is output by the first buffer 206. In block 304, trace data received by the second buffer is output to a bridge. In one embodiment, the second buffer 208 may output trace data to the bridge 214. In block 306, trace data received is output by the bridge to an output at a third clock frequency. In one embodiment, the bridge 214 shown in FIG. 2 may output trace data to an output 212. As discussed in various embodiments in regard to FIG. 2, the method of reducing buffer overflow shown in FIG. 3 may be performed with the second clock frequency being greater than the first clock frequency and the third clock frequency. The differences in the respective clock frequencies serve, at least in part, to virtually extend the size of the first buffer, to allow trace data to be extracted from the first buffer at a rate faster than it is normally received by the first buffer.

The method of FIG. 3 may be utilized with any of the various embodiments discussed throughout this application, including purposes of debugging, and debugging application firmware.

Hard Disk Implementation

Figure 4:
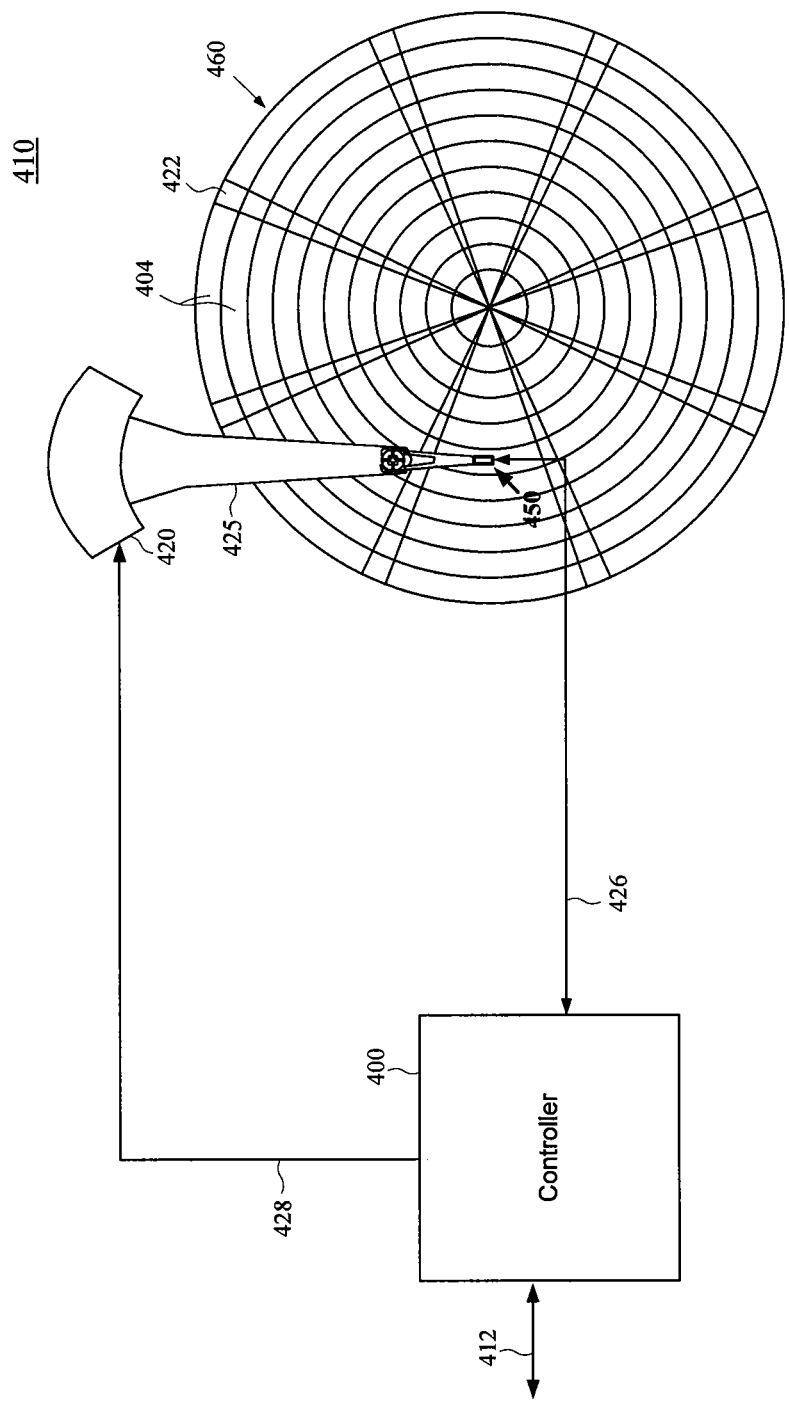
FIG. 4 is a block diagram of a data storage device, according to an embodiment of the present invention.

FIG. 4 illustrates an embodiment of the present invention in which the system 200 has been implemented as at least a portion of a controller 400 for a disk drive 410. In this embodiment, the system 200 may be configured as a debugger for operation of the disk drive 410. In other embodiments, the system 200 may be part of a data storage device such as a solid-state drive.

The disk drive 410 comprises a rotating magnetic disk 460 and a head 450 connected to the distal end of an actuator arm 425. The actuator arm 425 is rotated about a pivot by a voice coil motor (VCM) 420 to position the head 450 radially over the disk 460 for reading and writing data. The disk 460 comprises a number of radially spaced, concentric tracks 404. Each track 404 may be partitioned into a number of data sectors (not shown) that are spaced circumferentially along the track 404. The disk 460 may also comprise a plurality of embedded servo sectors 422, each of which may include position information that can be read from the disk 460 by the head 450 to determine the position of the head 450 over the disk 460.

The disk drive 410 includes the controller 400 that performs various operations of the disk drive 410 described herein. The controller 400 may be implemented using embodiments of the system 200 in FIG. 2. For example, the processor 202 in FIG. 2 may execute various functions of the controller 400. The processor 202 may output trace data to an output 412. The processor 202 may also deliver a control signal 428 to the VCM 420, and may deliver a read and/or write signal 426 to the head 450.

As discussed above, the controller 400 may be implemented using the system 200 in FIG. 2. In one embodiment, processor 202 is configured to control operation of at least a portion of the disk drive. For example, the processor 202 may handle read/write commands from the host and determine the physical locations on the disk 460 to which data is written and from which data is read. In one embodiment, processor 202 may control actuation of the actuator arm 425 via the VCM 420 to position the head 450 at a desired location of the disk 460. For example, processor 202 may determine where to write data to the disk 460. Processor 202 may then control actuation of the actuator arm 425 to position the head 450 at the location to write the data. The processor 202 may operate in conjunction with various other processors to control operation of the disk drive 410. In this example, the debug properties described in references to the system 200 may be used to debug various operations of the controller 400.

The description is provided to enable any person skilled in the art to practice the various embodiments described herein. While the present disclosure has been particularly described with reference to the various figures and embodiments, it should be understood that these are for illustration purposes only and should not be taken as limiting the scope of the disclosure.

There may be many other ways to implement the embodiments disclosed herein. Various functions and elements described herein may be partitioned differently from those shown without departing from the spirit and scope of the disclosure. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the disclosure.

A reference to an element in the singular is not intended to mean "one and only one" unless specifically stated, but rather "one or more." The term "some" refers to one or more. Underlined and/or italicized headings and subheadings are used for convenience only, do not limit the disclosure, and are not referred to in connection with the interpretation of the description of the disclosure. All structural and functional equivalents to the elements of the various embodiments of the invention described throughout this disclosure that are known or later come to be known to those of ordinary skill in the art are expressly incorporated herein by reference and intended to be encompassed by the disclosure. Moreover, nothing disclosed herein is intended to be dedicated to the public regardless of whether such disclosure is explicitly recited in the above description.

What is claimed is:

1. A disk drive, comprising:
    a disk;
    a head configured to write data to and read data from the disk;
    a processor configured to control operation of at least a portion of the disk drive;
    a trace module having a first buffer configured to receive trace data from the processor at a first clock frequency;

a second buffer configured to receive trace data from the first buffer at a second clock frequency; and a bridge configured to receive trace data from the second buffer and output the trace data received from the second buffer at a third clock frequency, the second clock frequency being greater than the first clock frequency and the third clock frequency.

2. The disk drive of claim 1, wherein a ratio of the first clock frequency and the second clock frequency is set such that the trace data received by the first buffer from the processor does not overflow the first buffer.

3. The disk drive of claim 1, wherein the third clock frequency is equal to the first clock frequency.

4. The disk drive of claim 1, wherein the second buffer has a greater trace data storage capacity than the first buffer.

5. The disk drive of claim 1, wherein the processor is configured to operate at a first clock speed and at least a portion of the first buffer and the second buffer are both configured to operate at a second clock speed that is greater than the first clock speed.

6. The disk drive of claim 5, wherein at least a portion of the trace module is configured to operate at the first clock speed.

7. The disk drive of claim 1, wherein the first buffer is a first-in-first-out buffer.

8. The disk drive of claim 1, wherein the trace module is an embedded trace macrocell.

9. The disk drive of claim 1, wherein the bridge is configured to output trace data to a trace port interface unit that is configured to output trace data received from the bridge to a debugging connector.

10. The disk drive of claim 1, wherein the trace module, the first buffer, the second buffer, and the bridge are each embedded on a chip.

11. A system comprising:
a processor;
a trace module having a first buffer configured to receive trace data from the processor at a first clock frequency;
a second buffer configured to receive trace data from the first buffer at a second clock frequency; and
a bridge configured to receive trace data from the second buffer and output the trace data received from the second buffer at a third clock frequency, the second clock frequency being greater than the first clock frequency and the third clock frequency.

12. The system of claim 11, wherein the system is embedded on a chip.

13. The system of claim 11, wherein a ratio of the first clock frequency and the second clock frequency is set such that the trace data received at the first buffer from the processor does not overflow the first buffer.

14. The system of claim 11, wherein the processor is configured to operate at a first clock speed and the first buffer and the second buffer are both configured to operate at a second clock speed that is greater than the first clock speed.

15. A method of reducing buffer overflow during data tracing comprising:
receiving trace data at a first clock frequency at a first buffer, the trace data received from a processor;
outputting the trace data received by the first buffer to a second buffer at a second clock frequency;
outputting the trace data received by the second buffer to a bridge; and
outputting the trace data received by the bridge to an output at a third clock frequency, the second clock frequency being greater than the first clock frequency and the third clock frequency.

16. The method of claim 15, wherein a ratio of the first clock frequency and the second clock frequency is set such that the trace data received at the first buffer from the processor does not overflow the first buffer.

17. The method of claim 15, wherein the third clock frequency is equal to the first clock frequency.

18. The method of claim 15, wherein the second buffer has a greater trace data storage capacity than the first buffer.

19. The method of claim 15, wherein the output is a trace port interface unit.

20. The method of claim 15, wherein the first buffer is a component of an embedded trace macrocell.

* * * * *